United States Patent
Frischholz

(10) Patent No.: US 7,027,617 B1
(45) Date of Patent: Apr. 11, 2006

(54) METHOD AND SYSTEM FOR PREVENTING FRAUD IN THE BIOMETRIC DETECTION OF PERSONS

(75) Inventor: Robert Frischholz, Erlangen (DE)

(73) Assignee: HumanScan GmbH, Erlangen (DE)

( * ) Notice: Subject to any disclaimer, the term of this patent is extended or adjusted under 35 U.S.C. 154(b) by 0 days.

(21) Appl. No.: 09/889,600

(22) PCT Filed: Jan. 18, 2000

(86) PCT No.: PCT/EP00/00367

§ 371 (c)(1),
(2), (4) Date: Dec. 14, 2001

(87) PCT Pub. No.: WO00/43960

PCT Pub. Date: Jul. 27, 2000

(30) Foreign Application Priority Data

Jan. 19, 1999 (DE) .................. 199 01 881

(51) Int. Cl.
*G06K 9/00* (2006.01)
(52) U.S. Cl. ............ 382/107; 382/115; 340/5.83
(58) Field of Classification Search ........ 382/107, 382/115–127, 103, 324; 340/5.52, 5.53, 340/5.81–5.84
See application file for complete search history.

(56) References Cited

U.S. PATENT DOCUMENTS

| | | | |
|---|---|---|---|
| 4,841,575 A | 6/1989 | Welsh et al. | |
| 5,483,601 A * | 1/1996 | Faulkner | 382/115 |
| 5,561,718 A * | 10/1996 | Trew et al. | 382/118 |
| 5,719,951 A | 2/1998 | Shackleton et al. | |
| 5,729,619 A * | 3/1998 | Puma | 382/115 |
| 5,774,591 A | 6/1998 | Black et al. | |
| 5,953,102 A * | 9/1999 | Berry | 351/247 |
| 5,963,300 A * | 10/1999 | Horwitz | 351/209 |
| 6,101,264 A * | 8/2000 | Wagner et al. | 382/115 |

FOREIGN PATENT DOCUMENTS

EP     0758776     2/1997

* cited by examiner

*Primary Examiner*—Brian Werner
*Assistant Examiner*—Christopher Lavin
(74) *Attorney, Agent, or Firm*—Duane Morris LLP

(57) ABSTRACT

The invention relates to a method and system of securing forgery in biometrical identification of persons, wherein at least one biological characteristic of a person is recorded and transformed into personal data, and the personal data are compared with reference data in order to identify the person. The person is caused to carry out a controllable motion before, after, or during the identification and this motion is recorded. In particular, objects are displayed successively at different positions on screen, and it is verified whether the person's line of sight follows the object so as to find out whether indeed a living person rather than a copy is located in front of the identification system.

16 Claims, 2 Drawing Sheets

METHOD AND SYSTEM FOR PREVENTING FRAUD IN THE BIOMETRIC DETECTION OF PERSONS

Figure 1:
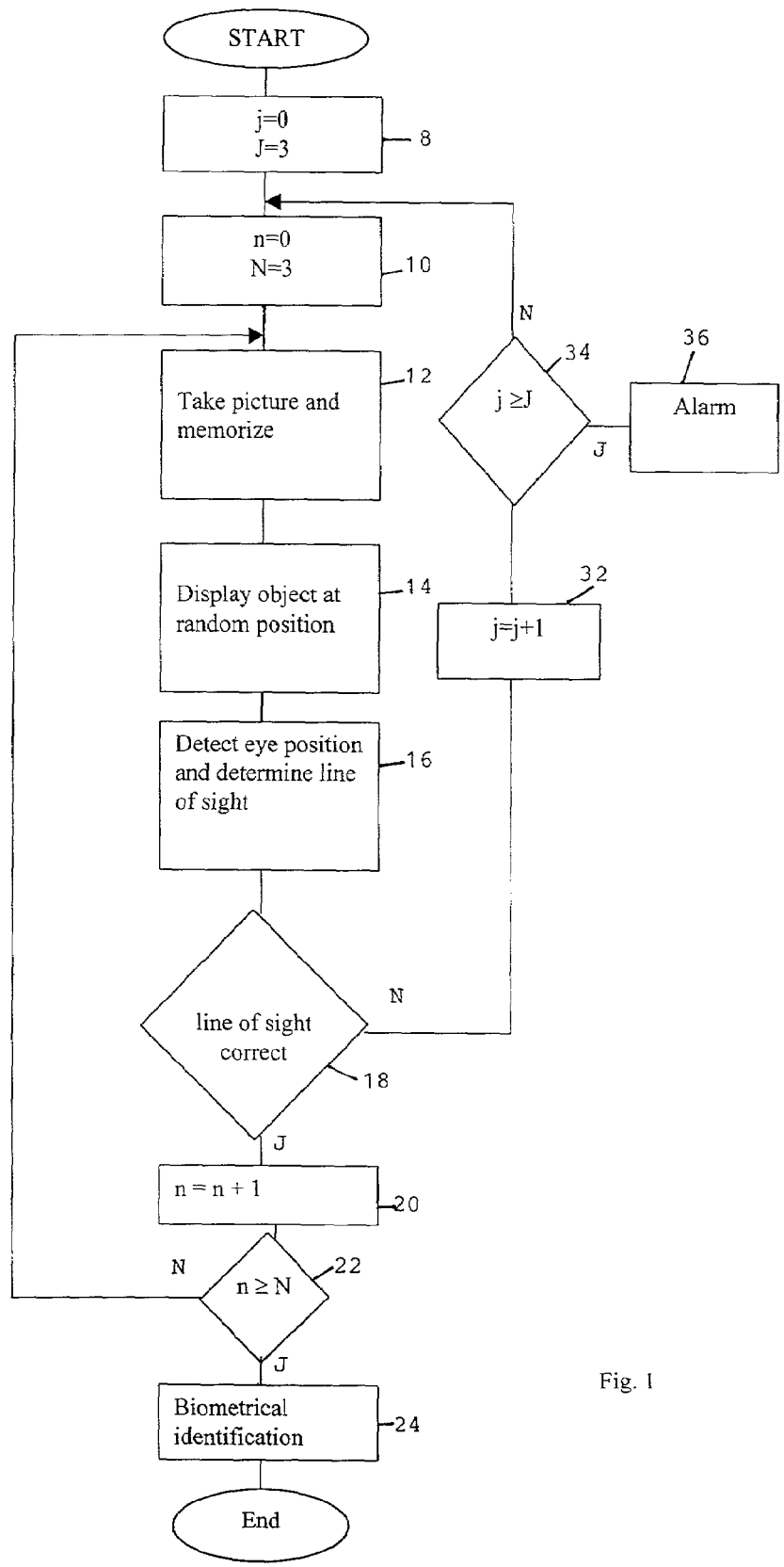

The invention relates to a method and a system of securing forgery in a biometrical identification of a person according to the preamble of claims 1 and 11, respectively. Such methods and systems are known from DE 44 13 788, U.S. Pat. No. 4,841,575 and U.S. Pat. No. 5,483,601.

Methods and systems of biometrical identification of persons are known which rely on a combination of facial recognition and recognition of lip movements. Such a method has been described, for example, in the applicant's German patent application 19 847 261 to which reference is made here. In personal recognition a distinction is made between the identification of one person among many others, i.e. answering the question: "Who is the person?" and the verification of a person, i.e. comparing the person's data with a certain data set or answering the question: "Is the person the one it purports to be?". The invention relates to the latter case.

Biometrical personal identification methods are thought to be especially reliable because they make use of characteristics which are specific to a person. And yet the biometrical identification of persons is not completely safeguarded against falsifications. A special risk are the so-called replay attacks with which the biometrical data set of a person is entered illegally into a system so that the identification system supposedly identifies the biometrical data of a person and, for instance, grants that person access to a protected area or enables execution of a particular transaction.

Methods of safeguarding personal access data likewise are known in the art. With these methods of protection it must be noted that a fundamental difference exists between the biometrical identification of a person and other customary protective mechanisms, such as the allocation of a secrete code or password. If a secrete code or password is misappropriated its abuse can be prevented by blocking and reissuing it. It is practically impossible, on the other hand, to assign a new biometrical access identity because by its very nature it is peculiar to a person. For example, if the data set of a finger is spied out wrongfully in a finger print system this characteristic of a person cannot be assigned anew. The same is true of a facial recognition system because no other face can be used for identification of a person but the face of that very same person.

Nowadays, certain measures of security already are taken when the biometrical data of a person are recorded in order to ward off those kinds of abuse. They are directed, for instance, at determining whether indeed the person to be detected is in front of the recording apparatus rather than just a "copy", such as a photographic picture. In the case of facial recognition, for instance, attention can be paid to certain intrinsic movements within the face occurring during the recording, which would exclude the use of a photograph. It is evident that such safety measures are not invincible because the system might be outwitted by a video recording instead of a photograph.

It is even more difficult to protect biometrical data once they have been recorded. If an unauthorized person gets a hold of such a personal data record there is practically no chance of preventing that person from feeding the data illegally into an access data net and thus obtain acces to the system.

It is, therefore, an object of the instant invention to indicate a new method and system of biometrical identification of persons which offer better protection against forgery.

This object is met by a method comprising the features of claim 1 and a system comprising the features of claim 11.

The method and system according to the invention require the person to make a certain movement before, during, or after the personal data serving for the biometrical personal identification are detected. And it is verified whether the person actually made the movement before the identification of the person is continued. The invention thus utilizes an interactive method and system to guarantee that indeed a real user, namely the person wishing to obtain access to a protected area is located in front of the apparatus, rather than a copy.

In a first preferred embodiment of the invention a video camera is used to determine the position of the eyes and thus the line of sight of a person. For instance, any desired object is displayed on a screen and the person is asked to look at it. Detecting the position of the eyes can tell whether the person really looks in the given direction. By predetermining a plurality of such randomly located objects and verifying whether the line of sight of the person changes in accordance with the positions of the object it can be made sure that there is a living person in front of the identification system and that what is entered is not a copy of the biometrical data set of the person.

In an alternative embodiment of the invention the position of a finger on a digitizer tray or the like may be detected instead of the position of the eyes. To do that, a mark may be displayed at different locations on the tray, and it may be sensed whether the user has placed his finger on the various positions of the mark.

Only after the user's motions under the direction of the system have correctly followed the predetermined positions, are the biometrical data (of the face, fingerprint or the like) as recorded by video or other detecting means, verified to see whether the user is an authorized person.

It is practically impossible with the method and system according to the invention to abuse a completed biometrical data set for a replay attack. The arbitrary positioning of objects whose movements the test person must follow makes it impossible for anyone but a real person actually present to pass the verification test. It is preferred to place a plurality of objects successively at different positions in order to exclude any coincidental agreement of the line of sight, hand position, or the like with the position of the object.

Figure 2:
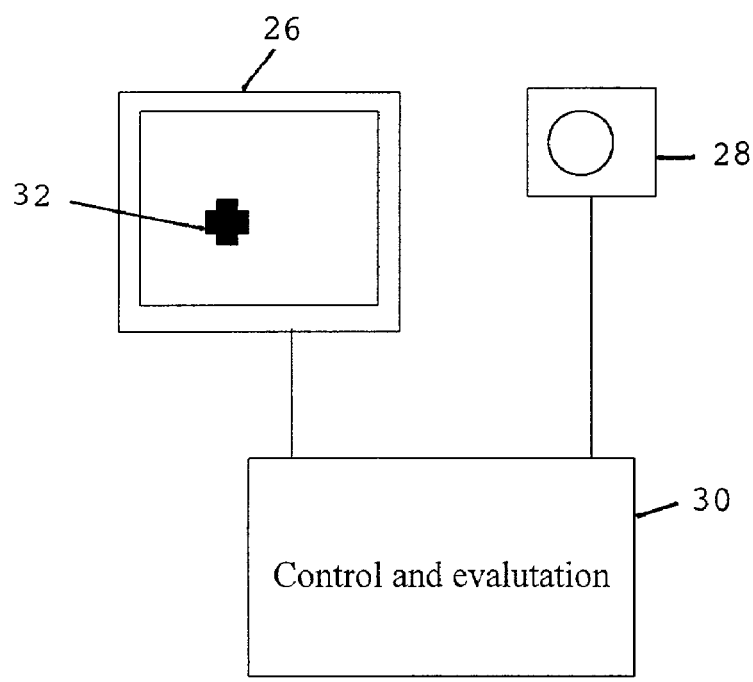

The invention will be described further, by way of preferred embodiments, with reference to the accompanying drawings, in which:

FIG. 1 is a flow diagram of a preferred embodiment of the method according to the invention; and FIG. 2 is a schematic block diagram of the system according to the invention for biometrically identifying persons.

FIG. 1 shows a preferred embodiment of the method according to the invention. In a first step 8, an error counter j is set to 0, and the number J of admissible false trials is fixed at 3, for example. In step 10, a test iteration counter n is set to 0, and the number N of test runs is fixed at 3, for instance. Any other suitable number may be chosen. In step 12, the video picture of a test person is recorded and stored in digital form. In step 14, thereupon, an object is displayed on a screen at a random position, and the test person is asked to look at the object.

In step 16, the pair of eyes of the test person are sensed, i.e. video detected and transduced into digitized form, and the line of sight is determined. That may be accomplished by applying the method described in patent DE 19 632 237, for example.

In step 18, it is verified whether the line of sight of the test person is directed at the object displayed on the screen. Here, a certain time interval may be predetermined within which the line of sight must lie in the right direction. If that does not happen, the method returns via steps 32 and 34 to step 10 so that the setting of the iteration counter n will continue to be 0. The whole identifying procedure is started once more. In step 32, the error counter is incremented by 1 and, in step 34, it is checked if the line of sight has failed J (=3) times to be directed towards the object displayed. If j<J renewed directing and detecting of the line of sight is started, in step 10. However, if J (=3) mistrials already have been made the identification loop is left via an alarm stage 36. An operator or a program will be notified, who or which may then initiate appropriate measures.

If, on the other hand, the line of sight is directed at the object displayed on the screen the iteration counter n is incremented by 1, in step 20. In step 22, it is verified whether the iteration counter n has reached the maximum number N (=3) of runs. If that is not the case the program returns to step 12 where again the picture of the test person is taken and memorized. Subsequently, the line of sight is verified in steps 14 to 18. During this run, and every consecutive one, the object always is shown at a different place on the screen.

Upon successful termination of the predetermined number of test runs, i.e. if in the present case n=N=3, the safety check has been completed positively and, in step 24, the procedure continues with the biometrical identification which may take the course as described in patent application DE 19 847 261.

FIG. 2 is a greatly simplified illustration of the system according to the invention of identifying persons according to a preferred embodiment, including its fundamental elements. The system comprises a monitor 26, a camera 28, and a control and evaluator unit 30. An object 32 is displayed on the monitor 26 at a randomly selectable position to direct the line of sight of a test person (not shown). A video picture of the test person, especially of the face of the test person or even more specifically of the eyes of the test person may be taken by the camera 28. The picture is digitized and processed in the control and evaluator unit 30 in accordance with the method described above.

It is a great advantage of the invention that it can be implemented with standard hardware, such as a conventional PC including a monitor and video camera. It does not require any special environment. The predetermination of a greater number of randomly selected object positions on the monitor allows any desired high level of security to be achieved.

As mentioned initially, it is possible, of course, to apply other biometrical methods of detection besides optically scanning a test person. For example, a fingerprint may be recorded by thermal, capacitive or other methods at different predeterminable positions on a display or detector screen.

In future, the method and system according to the invention may be used for automatic and biometrical access control. A procedure of verifying the line of sight of the eyes, the position of a finger, or the like either before, during, or after the identification procedure ensures that the personal identification indeed is effected on a living being. A comparison of the personal data resulting from that procedure with reference data guarantees that the person really is a desired or authorized individual.

The above merely describes the fundamentals of the invention without going into detail as regards per se known methods of biometrically identifying persons. Such methods are specified, for example, in patent application DE 19 847 261 to which reference was made above and also in the publications mentioned in that patent application. A person having average skill in the art will be able to select a method of identifying persons which is suitable for any specific application.

The features disclosed in the specification above, in the claims and drawings may be essential for implementing the invention in its various embodiments, both individually and in any combination desired.

What is claimed is:

1. A method of securing forgery in biometrical identification of persons which includes detecting at least one biological characteristic of a person and transforming it into personal data in order to recognize the person wherein before, during or after the detecting at least one biological characteristic, the person is caused to carry out a controllable motion, and a condition precedent to the biometrical identification is verification of the presence of the person based on said motion being detected, wherein said controllable motion is directing the person's eyes to a randomly positioned target for each verification.

2. The method as claimed in claim 1, wherein a line of sight of the person is controlled and the position of the eyes is detected.

3. The method as claimed in claim 2, wherein at least one mark is preset at a random position on a monitor, and it is detected whether the person's line of sight is directed to that mark.

4. The method as claimed in claim 1 wherein the person is caused to place a hand or parts thereof at a predeterminable position on a biometrical detector means, and that biometrical data of the hand or parts thereof at this position are detected.

5. The method as claimed in claim 1, wherein a first target direction is predetermined for the motion and it is checked whether a first motion follows the predetermined target direction, and at least one other target direction is predetermined which differs from the first target direction, and it is checked whether at least a second motion follows this other target direction, and the biological characteristic of the person is detected if at least the first and second motions follow the respective target directions.

6. The method as claimed in claim 5, wherein an alarm is given if the motions do not follow the target directions repeatedly in succession.

7. The method as claimed in claim 1, wherein an alarm is given if the motions do not follow the target directions repeatedly in succession.

8. The method as claimed in claim 1, wherein a facial picture is taken of the person and digitized, and the actual position of the eyes in the digitized image is detected and compared with a rated eye position, and the digitized facial image is compared with at least one digital facial reference image if the actual eye position largely corresponds with the rated eye position.

9. The method as claimed in claim 1, wherein the motion is detected before, after, or during the identification of the person.

10. A method of biometrical identification of persons comprising a method as claimed in claim 1, wherein the person's data are compared with reference data.

11. A system of securing forgery in biometrical identification of persons, comprising a detector means for detecting at least one biological characteristic of a person and a processing means for transforming the characteristic detected into personal data, comprising: a directing means for inducing a certain motion of the person's eyes in response to a randomly positioned target, the motion being detected by the detector means, wherein said processing means verifies whether the person is actually present independently of the detection result.

12. The system as claimed in claim 11, wherein the directing means comprises a monitor on which a mark is adapted to be displayed at random positions in order to direct the person's motion to that mark.

13. The system as claimed in claim 12, wherein the directing means controls the person's line of sight, the detector means detects the eye position, and the processing means digitizes the eye position detected and compares it with the rated eye position.

14. The system as claimed in claim 11, wherein the directing means is part of the detector means.

15. A system for biometrical identification of persons, comprising a system as claimed in claim 11, wherein the processing means compares the person's data with reference data.

16. In a system of identification of a person by comparison of a stored prerecorded biometric characteristic of the person in digitized form and an observed biometric characteristic of the person in digitized form, the method of preventing the fraudulent substitution of prerecorded biometric characteristics for the observed biometric characteristics, comprising:

before, after or during obtaining the observed biometric characteristic for use in the comparison, causing movement of the observed biometric characteristic by directing the person's eyes to a randomly positioned target; verifying the presence of the person whose biometric characteristics are being observed based on the eye movement; and performing the comparison using the obtained biometric characteristic.

* * * * *